(12) United States Patent
Nania

(10) Patent No.: US 6,971,705 B2
(45) Date of Patent: Dec. 6, 2005

(54) RETRACTABLE TOP SYSTEM FOR VEHICLES WITH MOVABLE REAR SECTION

(75) Inventor: Adrian Nania, Rochester, MI (US)

(73) Assignee: Edscha Roof Systems, Inc., Pontiac, MI (US)

( * ) Notice: Subject to any disclaimer, the term of this patent is extended or adjusted under 35 U.S.C. 154(b) by 0 days.

(21) Appl. No.: 10/663,388

(22) Filed: Sep. 16, 2003

(65) Prior Publication Data

US 2004/0056506 A1 Mar. 25, 2004

Related U.S. Application Data

(60) Provisional application No. 60/412,040, filed on Sep. 19, 2002.

(51) Int. Cl.[7] ................................................. B60J 7/00

(52) U.S. Cl. ...................................... 296/118; 296/122

(58) Field of Search ........................ 296/111, 114, 118, 296/121, 122

(56) References Cited

U.S. PATENT DOCUMENTS

| 2,763,509 A | * | 9/1956 | Hennessy ................... 296/118 |
| 5,887,936 A | | 3/1999 | Cowsert ................. 296/107.07 |
| 6,270,143 B1 | * | 8/2001 | Heselhaus et al. ..... 296/107.01 |
| 6,283,532 B1 | | 9/2001 | Neubrand .............. 296/107.07 |
| 6,295,713 B1 | | 10/2001 | Hilliard et al. ............... 29/446 |
| 6,796,595 B2 | * | 9/2004 | Doncov ................. 296/107.09 |

\* cited by examiner

Primary Examiner—Stephen Gordon
(74) Attorney, Agent, or Firm—Davidson, Davidson & Kappel, LLC

(57) ABSTRACT

A convertible top for a vehicle having a vehicle body has a backlite having a first position corresponding to a retracted position of the convertible top and a second position corresponding to a deployed position of the convertible top. A floating bow is connected to the backlite, the floating bow having a raised position when the backlite is in the second position and a lowered position when the backlite is in the first position. An attachment device connects the floating bow to the vehicle body, the attachment device including a base section attachable to the vehicle body and an adjustment section connected to the floating bow and moveable with respect to the base section for adjusting the raised position of the floating bow.

9 Claims, 5 Drawing Sheets

RETRACTABLE TOP SYSTEM FOR VEHICLES WITH MOVABLE REAR SECTION

CROSS-REFERENCE TO RELATED APPLICATIONS

This application claims priority to U.S. provisional application Ser. No. 60/412,040, filed on Sep. 19, 2002.

BACKGROUND OF THE INVENTION

The present invention relates generally to convertible tops for motor vehicles, and more particularly to convertible tops with a floating bow.

Soft or hard convertible vehicle tops often have a rear section containing the rear window, referred to as the backlite. U.S. Pat. Nos. 5,887,936 6,283,532 for example disclose backlites for convertible tops.

In most convertible tops, movable bows are used to provide for movement of the various components of the convertible top. Soft or hard components can be attached to the bows. U.S. Pat. No. 6,295,713 for example discloses a soft convertible top having three bows. The rear bow movement is restrained in a closed top position by tension straps that are drawn taut when the soft top is in its operative position.

In order to provide for various convertible top configurations, for example for hatchbacks, it may be desirable to have a rear bow that slides or translates between two positions, one when the convertible top is open and the other when it is closed. A rear bow of this type is referred to herein as a floating bow.

The firm Edscha of Remscheid, Germany manufactures convertible soft tops with floating bows. Movement of the floating bows is restricted in one of two ways: (1) In a soft top for the Audi TT, hard paddles are used to restrict the movement. A slotted bracket on the vehicle body allows for vertical adjustment of the paddles. (2) In a soft top for the BMW Z8 a tension strap system is used mounted to a vertical surface, which is complex to mount and requires a vertical structural surface on the vehicle body. These types of surfaces are not always present in vehicles.

SUMMARY OF THE INVENTION

An object of the present invention is to provide for easy installment of convertible tops having floating bows.

An alternate or additional object of the present invention is to provide for easy adjustment of the position of floating bows when the convertible top is closed.

Yet another alternate or additional object of the present invention is to provide for a compact arrangement to permit floating bow type convertible tops to fit in compact spaces.

A further alternate or additional object of the present invention is to provide a convertible top where the floating bow may be attached to a horizontal plane of the vehicle body.

The present invention provides a convertible top for a vehicle having a vehicle body comprising: a backlite having a first position corresponding to a retracted position of the convertible top and a second position corresponding to a deployed position of the convertible top; a floating bow connected to the backlite, the floating bow having a raised position when the backlite is in the second position and a lowered position when the backlite is in the first position; and an attachment device for connecting the floating bow to the vehicle body, the attachment device including a base section attachable to the vehicle body and an adjustment section connected to the floating bow and moveable with respect to the base section for adjusting the raised position of the floating bow.

By having an adjustment section connected to the floating bow, the convertible top and position of the floating bow may be easily adjusted at the time of installation and afterwards. Maintenance operations are also simplified. Access to the adjustment section is also permitted while an operator can visually inspect the position of the floating bow in the raised position, for example against a seal. The adjustment section can be mounted on a horizontal plane as well, and provides for a compact arrangement.

Preferably, the convertible top includes at least one flexible strap connecting the adjustment section to the floating bow.

The base section preferably is rotationally fixed with respect to the vehicle body, and the adjustment section includes a screw that translates with respect to the base section. The adjustment section also preferably includes an adjustment nut in which the screw turns. The adjustment nut is rotationally fixed with respect to the base section, but translationally moveable with respect to the base section.

The base section preferably is made of rubber to reduce noise and vibration. It preferably has a middle section with two flat sides for interacting with a keyhole slot in the vehicle body and preventing rotation of the base section. Easy mounting of the adjustment section without any special tools is thus possible.

Preferably, two rods are attached to the adjustment nut for supporting a strap connected to the floating bow.

The floating bow preferably supports a section of a soft top connected to the backlite.

The present invention also provides a motor vehicle with the convertible top of the present invention.

The present invention also provides an attachment device for connecting a convertible top to a vehicle body comprising: a base section for being fixed to the vehicle body; a nut for connecting to the convertible top and fixed rotationally with respect to the base section; and a screw passing through the base section and interacting with the nut so as to move the nut translationally.

The present invention also provides a method for installing a convertible top having a floating bow comprising the steps of: attaching an attachment device having a base section and an adjustment section to a slot in a vehicle body so that the base section is rotationally fixed with respect to the vehicle body, the adjustment section being connected to the floating bow; and adjusting the adjustment section to set a desired position of the floating bow when the convertible top is deployed.

Preferably, the slot is a keyhole slot.

As used herein, a deployed position of the convertible top is a position in which the top covers a passenger compartment of the vehicle, and a retracted position is when the convertible top is down.

BRIEF DESCRIPTION OF THE DRAWINGS

The following figures shows a preferred embodiment of the present invention in which.

DETAILED DESCRIPTION OF A PREFERRED EMBODIMENT

Figure 1:
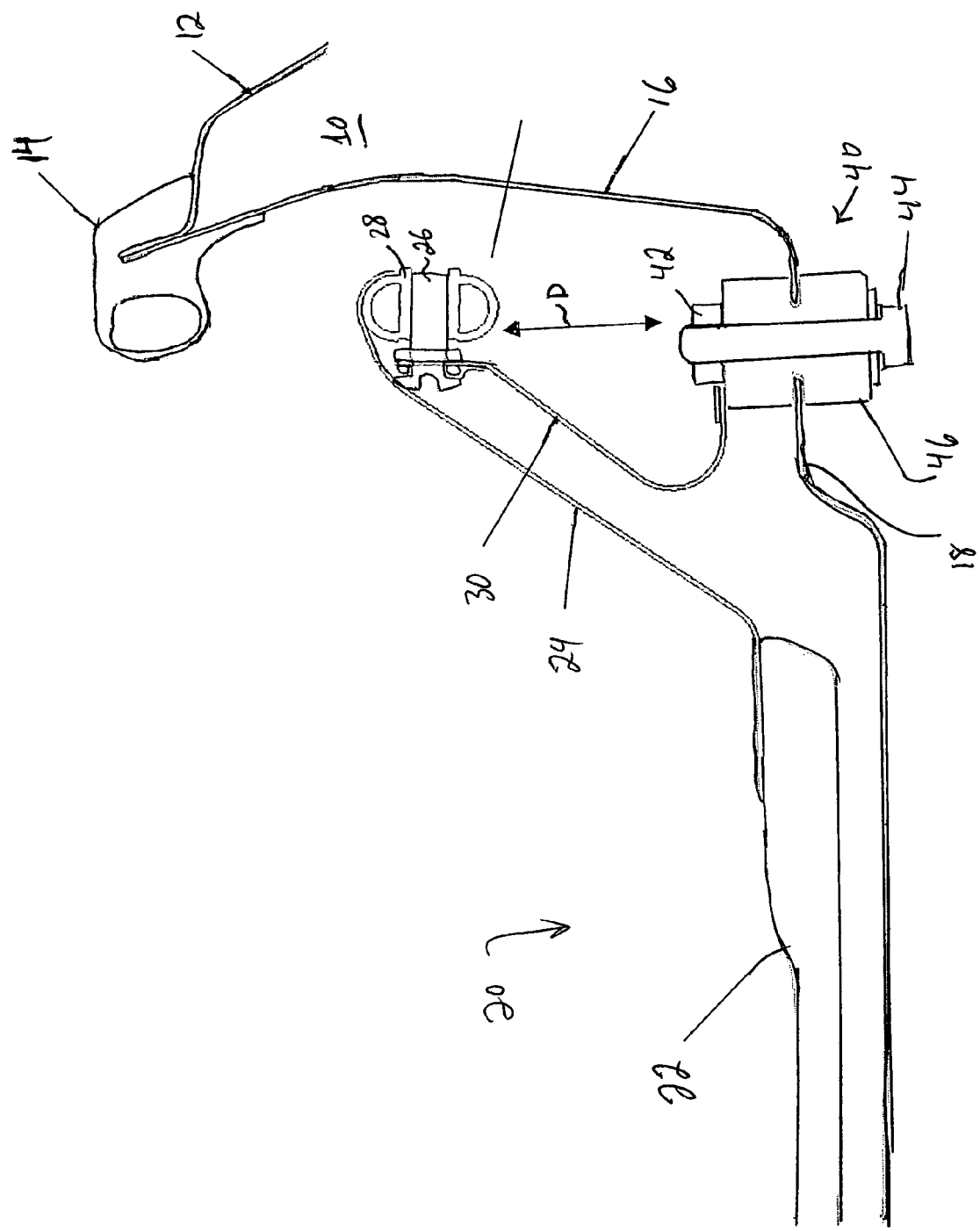
FIG. 1 shows a schematic cross-sectional view of a preferred exemplary embodiment of a rear of a vehicle with a convertible top according to the present invention in a retracted position.
Figure 5:
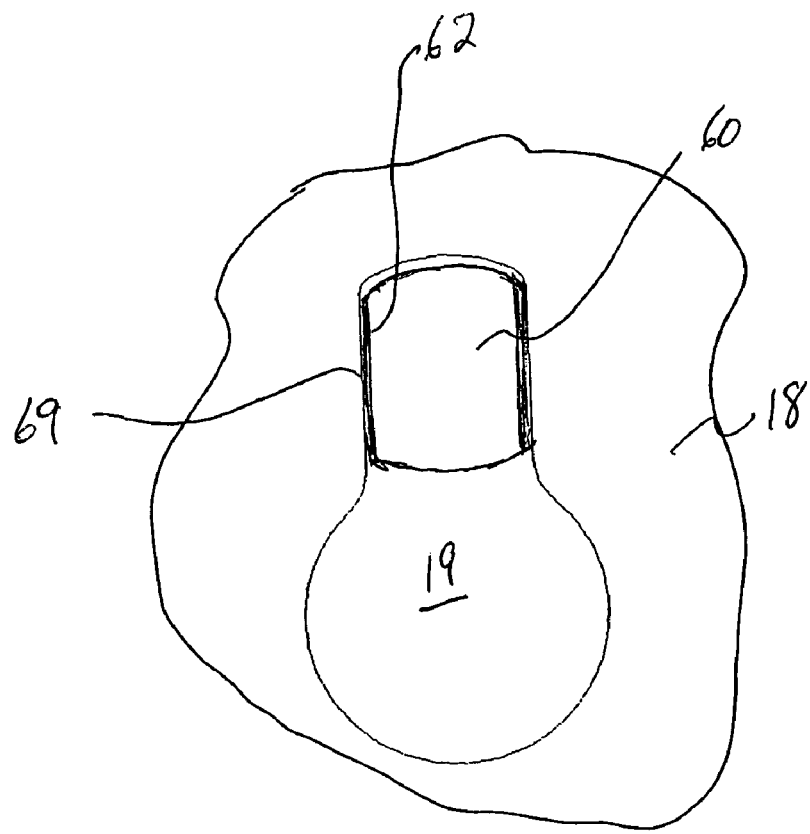
FIG. 5 shows a view of the vehicle key slot with a cross-section of the attachment device located in the slot.

FIG. 1 shows a schematic cross-sectional view of a preferred exemplary embodiment of a rear of a vehicle 10 with a convertible top 20 in a retracted position. Vehicle 10 has an outer sheet metal section 12 and an interior structure 16 for supporting the convertible top. Interior structure 16 has a horizontal section 18 with a keyhole slot 19, as shown in FIG. 5. At the top of the interior structure 16 is a seal, for example made of rubber, for sealing the convertible top 20 in a deployed position.

Convertible top 20 includes a backlite 22 having a rear window, a soft top section 24, for example made of canvas, and a floating bow 28. Floating bow 28 can move in the direction of arrow D, for example through side supports.

A connector 26, for example a screw, connects an end of a flexible strap 30 to the floating bow 28. The other end of the flexible strap 30 is connected to an attachment device 40 for attaching the strap to the vehicle 10. Attachment device 40 has a moveable nut 42, a base section 46 and an adjustment screw 44, the movable nut 42 and adjustment screw 44 defining an adjustment section for setting the position of the lower end of strap 30.

Figure 3:
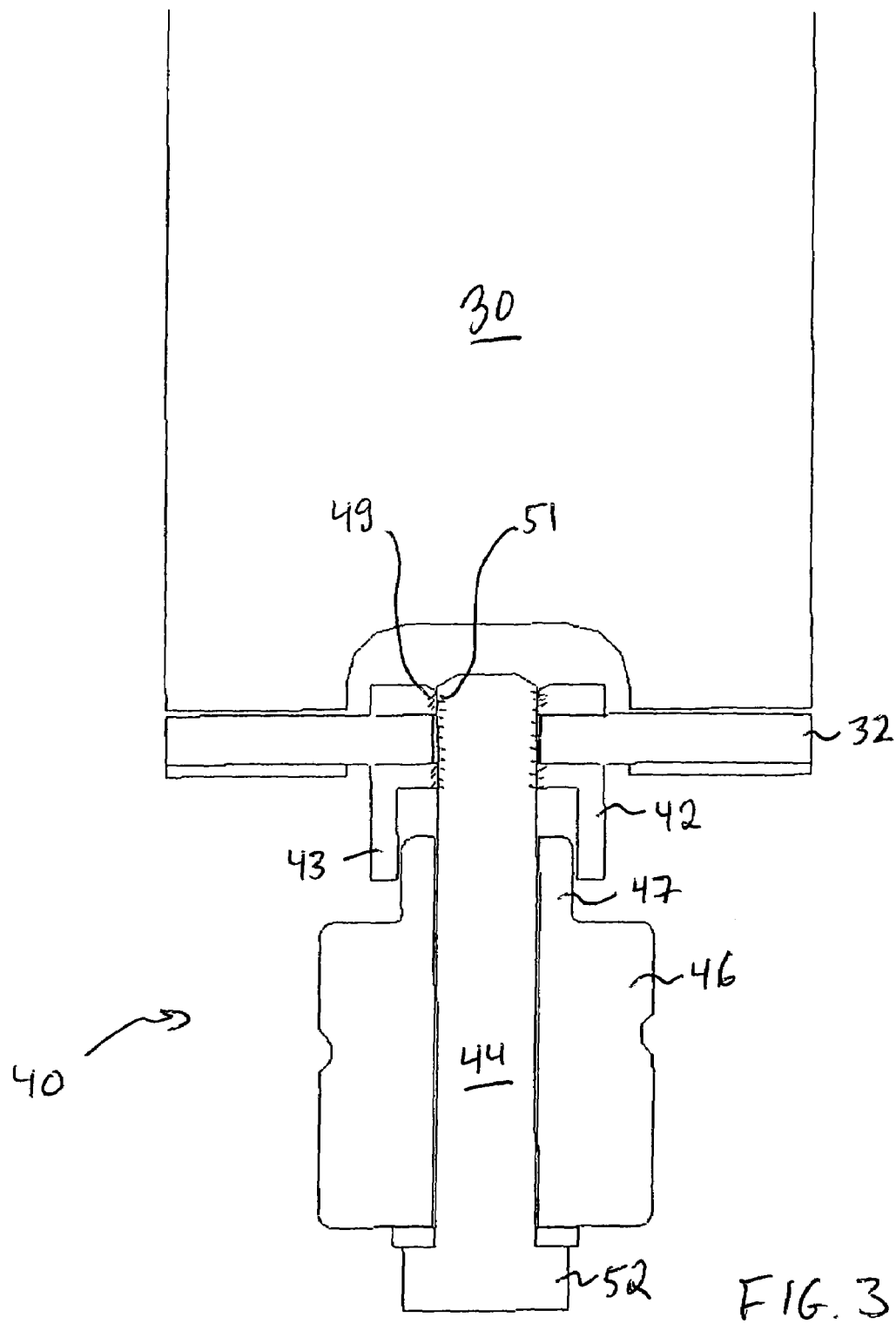
FIG. 3 shows a cross section of the attachment device of the present invention connected to a strap.
Figure 4:
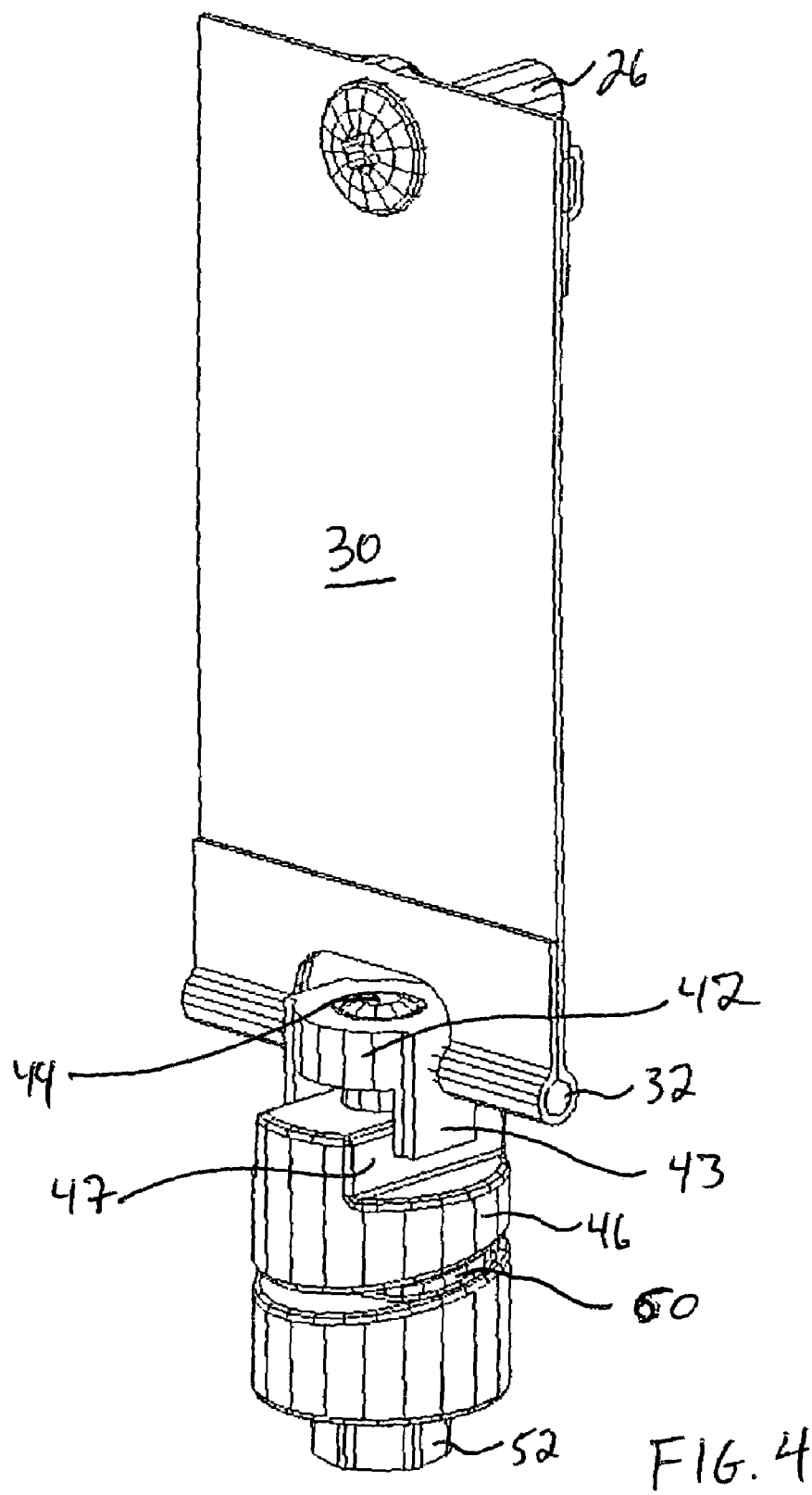
FIG. 4 shows a side perspective view of the attachment device of the present invention connected to a strap.

As shown in FIGS. 3 and 4, strap 30 is connected to adjustment section of attachment device 40 at moveable nut 42 by a pair of rods 32. Strap 30 can thus rotate with respect to rods 32 at the connection. Moveable nut 42 has interior threads 49 that interact with exterior threads 51 of an adjustment screw 44 of the adjustment section. Nut 42 is rotationally fixed but translationally moveable with respect to a base section 46 via the interaction of a flat section 47 of base section 46 with tongs 43 of nut 42. The position of rods 32 with respect to the base 46 and thus vehicle body 10 can be set by turning a head portion 52 of screw 44, which causes nut 42 to translate with respect to base 46.

Base section 46 preferably is made of rubber or other polymeric material so as to function as an isolator puck for reducing noise and vibration, and has a middle section 60 with flat walls 62 for interacting with an extension section 69 of keyhole slot 19, as shown in FIG. 5. Base section 46 thus is fixed with respect to vehicle body 10 once inserted in the slot 19 and slid in an installation maneuver so that flat walls 62 interact with extension section 69. Preferably, the base section 46 is designed so that a force fit between the base section 46 and vehicle body 10 results once base section 46 installed. As shown in FIG. 4, the angled nature of middle section 60 can aid in this force fit as well.

Figure 2:
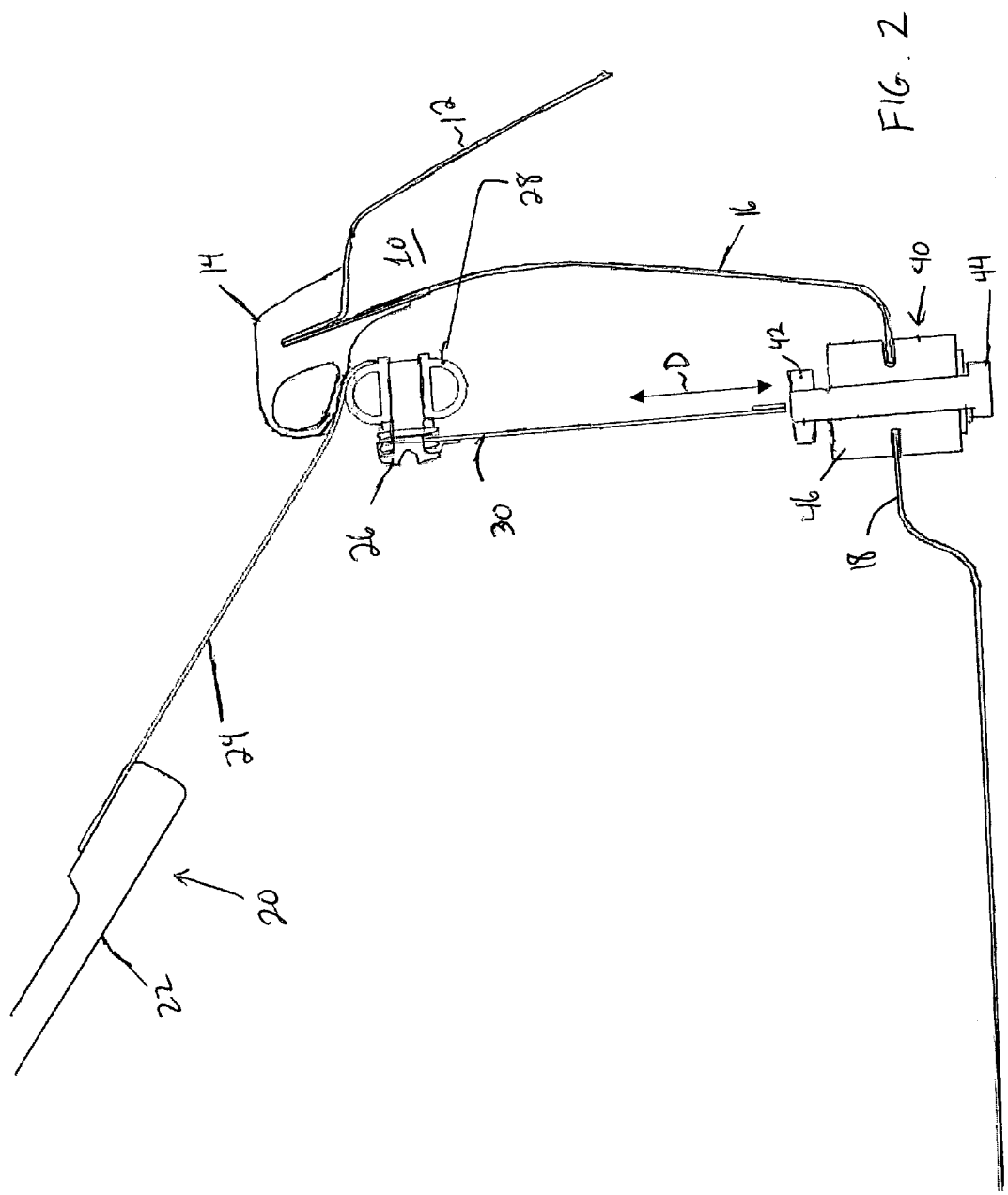
FIG. 2 shows the convertible top of FIG. 1 with the convertible top in a deployed position.

FIG. 2 shows the convertible top of FIG. 1 with the convertible top in a deployed position. This can be accomplished manually or with an automatic device, which moves backlite 22 upwardly, causing section 24 to become taut and moving floating bow 28 upwardly in direction D until strap 30 is taut. Floating bow 28 thus contacts seal 14.

Depending on the adjustment of nut 42 (shown in a different adjustment position in FIG. 2 from that of FIG. 1), the pressure of the bow 28 against seal 14 can be adjusted, as the uppermost position of bow 28 is a function of the position of nut 42 with respect to the base 46 and thus vehicle body 10. When the bow 28 is lowered again to the position in FIG. 1, the strap 30 folds and rotates around pins 32 as shown.

The convertible top, while preferably a soft top, could also be used in a hard top configuration where the straps or other connectors connected to the attachment device are used to limit movement of a hard top component.

Preferably, the convertible top has two tension straps 30 on either side of bow 28, and the convertible top is assembled with all the components of the convertible top already manufactured. The attachment devices 40 then are passed through the keyhole slots in the vehicle 10 and slid into extensions 69. Once any other components are attached, the convertible top can be deployed and the seal pressure at seal 14 adjusted by an operator by turning screw 44.

The present invention is particularly advantageous for hatchback-type automobiles, in which floating bows moving vertically can provide a more compact arrangement when the convertible top is retracted.

What is claimed is:

1. A convertible top for a vehicle having a vehicle body comprising:
   a backlite having a first position corresponding to a retracted position of the convertible top and a second position corresponding to a deployed position of the convertible top;
   a floating bow connected to the backlite, the floating bow having a raised position when the backlite is in the second position and a lowered position when the backlite is in the first position; and
   an attachment device for connecting the floating bow to the vehicle body, the attachment device including a base section attachable to the vehicle body and an adjustment section connected to the floating bow and moveable with respect to the base section for adjusting the raised position of the floating bow.

2. The convertible top as recited in claim 1 further comprising a seal fixed to the vehicle body, the floating bow contacting the seal in the raised position.

3. The convertible top as recited in claim 1 further comprising at least one flexible strap connecting the adjustment section to the floating bow.

4. The convertible top as recited in claim 1 wherein the base section is rotationally fixed with respect to the vehicle body, and the adjustment section includes a screw that translates with respect to the base section.

5. The convertible top as recited in claim 4 wherein the adjustment section includes an adjustment nut in which the screw turns, the adjustment nut being rotationally fixed with respect to the base section, but translationally moveable with respect to the base section.

6. The convertible top as recited in claim 1 wherein the base section is made of rubber to reduce noise and vibration.

7. The convertible top as recited in claim 1 wherein the base section has a middle section with two flat sides for interacting with a keyhole slot in the vehicle body.

8. The convertible top as recited in claim 1 further comprising two rods attached to the adjustment nut for supporting a strap connected to the floating bow.

9. A motor vehicle comprising a vehicle body and a convertible top, the convertible top including:
   a backlite having a first position corresponding to a retracted position of the convertible top and a second position corresponding to a deployed position of the convertible top;

a floating bow connected to the backlite, the floating bow having a raised position when the backlite is in the second position and a lowered position when the backlite is in the first position; and an attachment device for connecting the floating bow to the vehicle body, the attachment device including a base section attachable to the vehicle body and an adjustment section connected to the floating bow and moveable with respect to the base section for adjusting the raised position of the floating bow.

* * * * *